United States Patent
Naftzger et al.

(10) Patent No.: US 11,557,010 B2
(45) Date of Patent: Jan. 17, 2023

(54) INTEGRATION OF MULTIPLE ELECTRONIC RECORDS

(71) Applicant: GBT TRAVEL SERVICES UK LIMITED, London (GB)

(72) Inventors: David Naftzger, Melbourne (AU); Ian Hennessy, Melbourne (AU); Hue Minh Tran, Melbourne (AU); Trent Hewitt, Melbourne (AU)

(73) Assignee: GBT TRAVEL SERVICES UK LIMITED, London (GB)

( * ) Notice: Subject to any disclaimer, the term of this patent is extended or adjusted under 35 U.S.C. 154(b) by 455 days.

(21) Appl. No.: 16/073,216

(22) PCT Filed: Feb. 22, 2017

(86) PCT No.: PCT/IB2017/050986
§ 371 (c)(1),
(2) Date: Jul. 26, 2018

(87) PCT Pub. No.: WO2017/145052
PCT Pub. Date: Aug. 31, 2017

(65) Prior Publication Data
US 2019/0213697 A1    Jul. 11, 2019

Related U.S. Application Data

(60) Provisional application No. 62/298,841, filed on Feb. 23, 2016.

(51) Int. Cl.
*G06Q 50/14* (2012.01)
*G06Q 10/02* (2012.01)

(52) U.S. Cl.
CPC ............. *G06Q 50/14* (2013.01); *G06Q 10/02* (2013.01)

(58) Field of Classification Search
CPC .............................. G06Q 50/14; G06Q 10/02
See application file for complete search history.

(56) References Cited

U.S. PATENT DOCUMENTS

2002/0178034 A1    11/2002  Gardner et al.
2003/0177045 A1*    9/2003  Fitzgerald .............. G06Q 10/02
                                                                            705/6

(Continued)

OTHER PUBLICATIONS

Gustafson, Per, "Managing business travel: Developments and dilemmas in corporate travel management", 2012, Tourism Management, vol. 33, Issue 2, pp. 276-284 (Year: 2012).*

(Continued)

*Primary Examiner* — Jeff Zimmerman
*Assistant Examiner* — Wayne S. Murray
(74) *Attorney, Agent, or Firm* — K&L Gates LLP

(57) ABSTRACT

Multiple record management functionality can be used for bulk PNR creation. The multiple record management functionality can take a structured input file containing travel requests and process the requests, such as by a set of client-specific rules, to create shell PNRs with the air segments and profile information included. The multiple record management functionality can also provide a reporting capability to detail the outcome of individual requests or a set of requests. Preference-driven bookings can be made based on a customer-defined overall value proposition. Bookings can be made for non-profiled travelers.

3 Claims, 13 Drawing Sheets

(56) References Cited

U.S. PATENT DOCUMENTS

| | | | |
|---|---|---|---|
| 2004/0117275 A1* | 6/2004 | Billera | G06Q 10/02 |
| | | | 705/28 |
| 2007/0118548 A1* | 5/2007 | Carapella | G06F 16/951 |
| 2007/0156469 A1 | 7/2007 | Bird et al. | |
| 2010/0207812 A1 | 8/2010 | Demirgjian et al. | |
| 2010/0280748 A1 | 11/2010 | Mundinger et al. | |
| 2010/0312586 A1 | 12/2010 | Drefs | |
| 2012/0136571 A1* | 5/2012 | Simon | G06Q 10/02 |
| | | | 701/465 |
| 2014/0181693 A1* | 6/2014 | Sullivan | G06Q 50/01 |
| | | | 715/753 |
| 2014/0278597 A1* | 9/2014 | Wilkinson | G06Q 10/02 |
| | | | 705/5 |
| 2015/0154517 A1* | 6/2015 | Shaw | G06Q 10/10 |
| | | | 705/5 |

OTHER PUBLICATIONS

Search Report issued for International Patent Application No. PCT/IB2017/050986 dated Jun. 16, 2017.
Written Opinion issued for International Patent Application No. PCT/IB2017/050986 dated Jun. 16, 2017.
International Preliminary Report on Patentability for International Patent Application No. PCT/IB2017/050986 dated Aug. 28, 2018.

* cited by examiner

Steps to create shell PNR

INTEGRATION OF MULTIPLE ELECTRONIC RECORDS

PRIORITY CLAIM

The present application is a National Phase of International Application No. PCT/IB2017/050986, filed Feb. 22, 2017, entitled, "Integration of Multiple Electronic Records," which claims priority to U.S. Provisional Application No. 62/298,841, filed Feb. 23, 2016, entitled, "Integration of Multiple Electronic Records," the entire contents of each of which are incorporated herein by reference and relied upon.

BACKGROUND

To facilitate creating, processing, billing, and record-keeping associated with travel reservations, information can be stored in the form of a Passenger Name Record (PNR). A PNR is an electronic record that can contain data fields comprising information used in conjunction with a travel itinerary. Such information can be grouped into a number of sets including those relating to information connected with a travel agency or other entity facilitating the reservation, with the company on whose behalf an individual may undertake a business trip, and with the individual himself or herself. PNRs can take multiple formats. For example, a certain GDS may use one format and a different GDS another one.

Typical information in a PNR comprises fields including passenger name, identity of travel agent, ticketing information, itinerary, and name of person making the booking. However, there can be many additional fields as well, such as remarks, form of payment, account numbers, frequent flyer numbers, and many more. In other words, a PNR can comprise a significant number of fields containing substantial information. In addition, in light of the fact that different GDS'es can use varying formats for PNRs—including varying field names, varying locations in a PNR where a field is located, and varying syntax within a field—this only adds to the permutations.

Given that two travellers may have significantly different travel parameters, two PNRs, even if similar in format, may be dissimilar in content. Even more, two PNRs, even if similar in format, may be different in content.

Despite the potential complexity of PNRs, however, once a PNR is created there can be powerful benefits. For example, if there is a need to exchange reservation information between parties, a PNR is an advantage. This may occur, for example, where two or more airline carriers are used in order to complete a journey. In addition, travel agencies can store profiles of their clients such as employers whose employees engage in business travel, and information related to the employees themselves, manage financial and administrative information, and conduct other activities. Generating PNRs, then, based on travel requests is an important step in reaping the benefits of the PNRs. And, of course, booking travel reservations in an optimal manner based on customer desires in light of availability flight inventory can be enhanced by efficient use and analysis of PNRs.

Moreover, a PNR may be considered not to contain enough information to be processed in a desired fashion. For example, there may be information desirable to report to a customer, or information by which to charge a customer, that may not be within the set of data from a PNR is constructed. f this is the case, it may inhibit efficient processing or even prevent travel booking entirely. Being able to define and act on a substandard information set, and still make a successful travel booking consistent with traveler and/or customer requirements, can be a benefit.

In addition, it is common, in the context of business travel, for there to be conditions specified within which the booking will take place. For example, a customer can have one or more employees engaging in business travel. The customer may seek to manage the conditions by which the employee or employees travel so as to minimize total expenses, maximize flexibility, factor in added considerations, and/or a combination of the foregoing,

DRAWINGS

Figure 8:
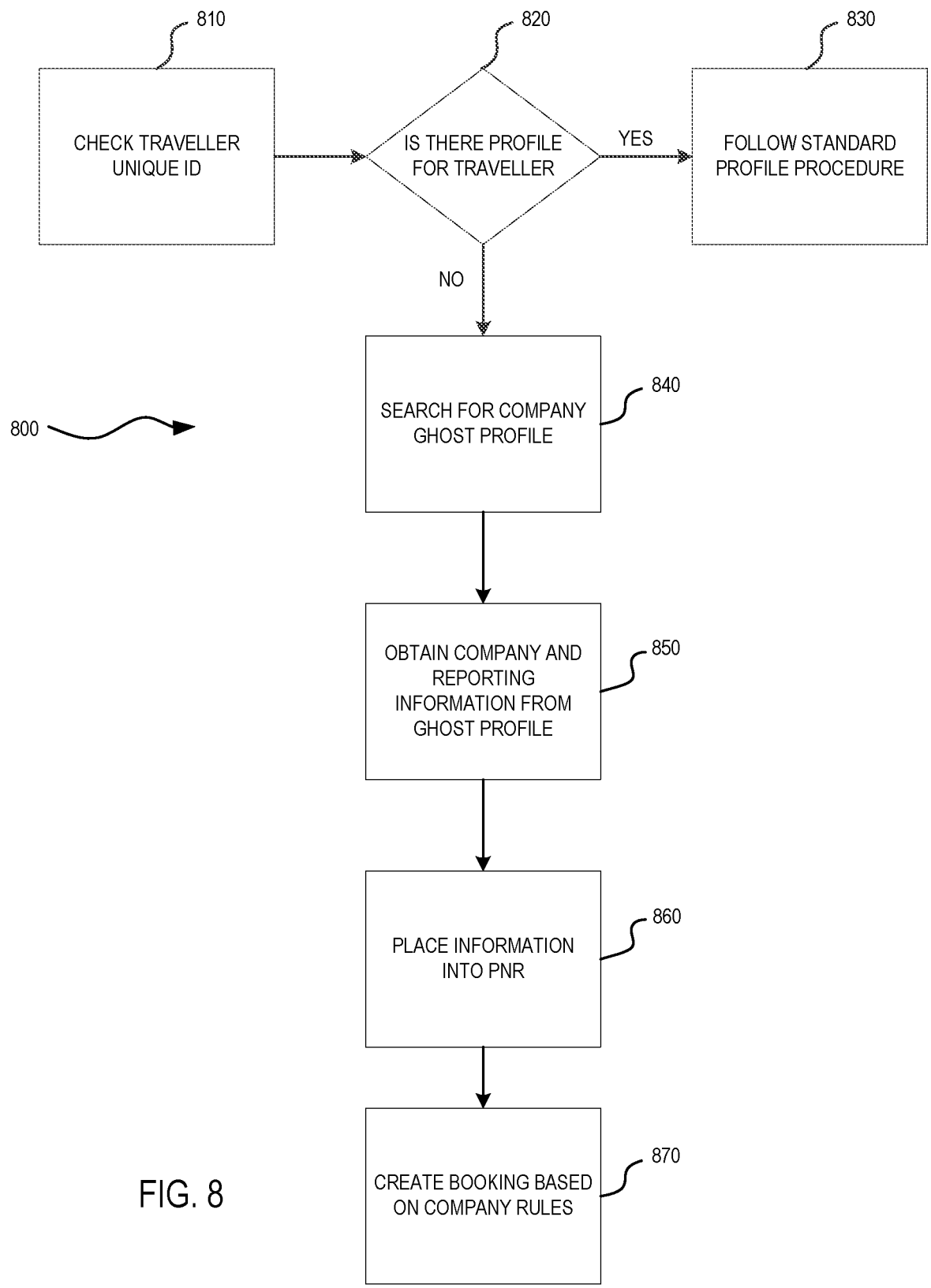

FIG. 8 an example process for handling a potentially non-profiled traveller.

Figure 9:
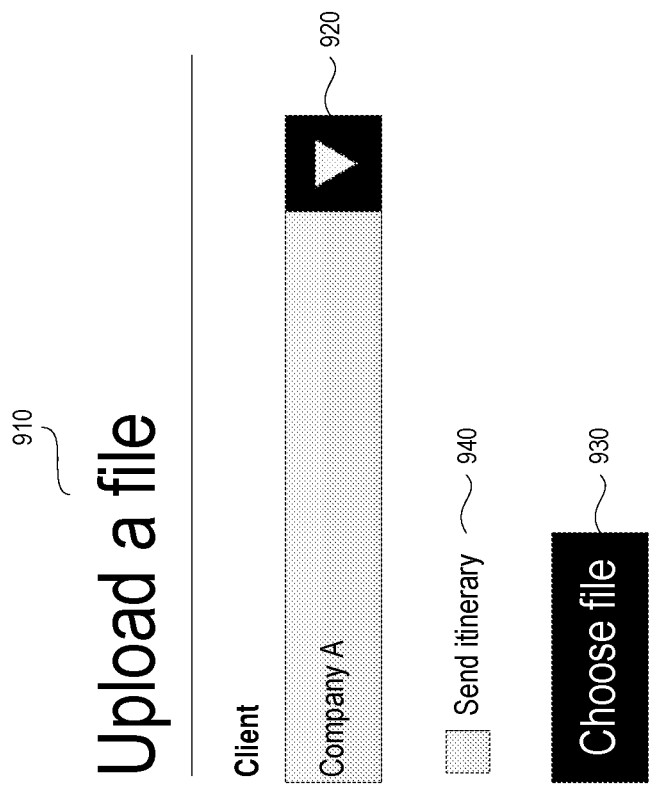

FIG. 9 is an example screenshot whereby a file can be uploaded to a booking system.

Figure 10:
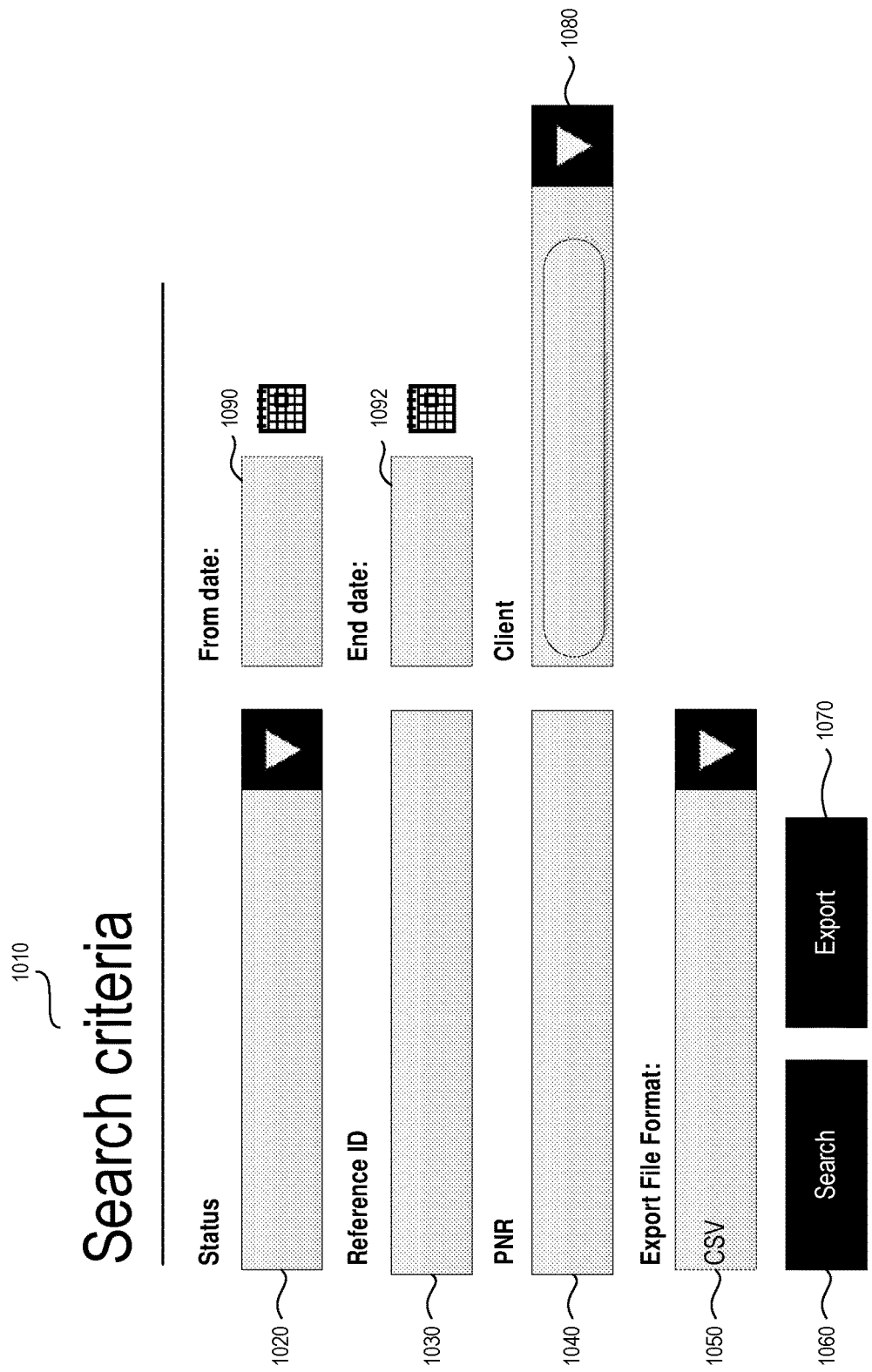

FIG. 10 is an example screenshot whereby a search can be made on a booking system.

Figure 11:
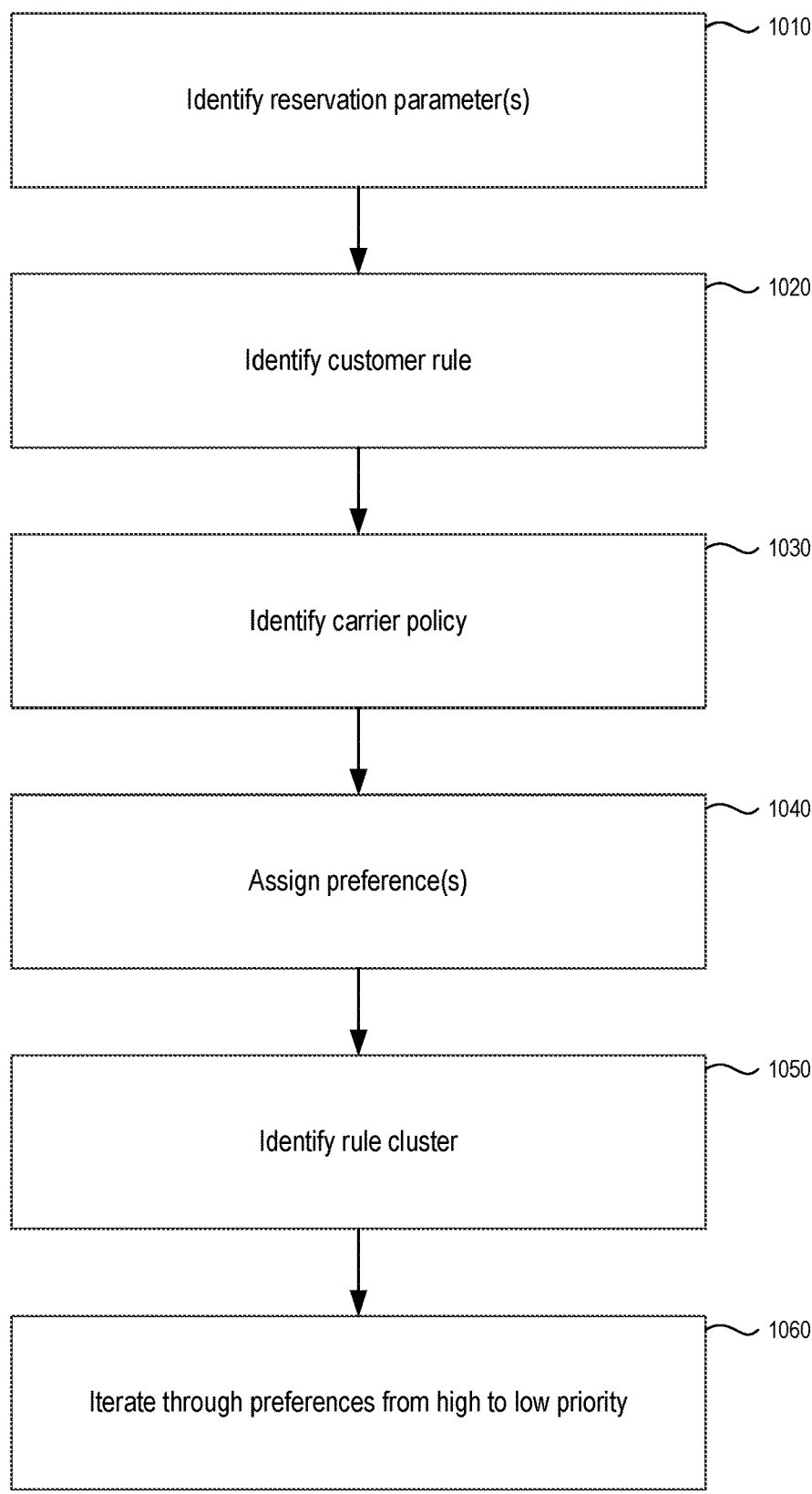

FIG. 11 is an example process for optimizing booking.

SUMMARY

In embodiments, disclosed is a computer-implemented method for integrating multiple electronic travel-related records comprising obtaining travel information, loading a corporate profile, loading a traveler profile, instructing that a search be carried out for a flight; and processing at least one booking based on a predetermined customer rule. Also, the booking can be processed based on a policy by a carrier. Further, a pseudo-city code can be emulated. In addition, a shell PNR can be emulated to. In addition, the predetermined customer rule can contain at least one priority designation, such designation assigned by a customer, and can be based on one or more of a booking class, carrier, origin city and destination city. In embodiments, the priority designation can be based on price alone; in other embodiments, the priority designation based on an overall value proposition to the customer or another party.

Additionally, in embodiments disclosed is a computer-implemented method for booking a flight, comprising Identifying a first customer rule associated with a customer, the customer rule based on an origin location for the flight, a destination location for the flight, and a booking class associated with the flight, and additionally assigning a priority to the customer rule. A second customer rule associated with a customer can be identified based on an origin location for the flight, a destination location for the flight, and a booking class associated with the flight, and a priority can be assigned to the second customer rule. The first customer rule can be assigned a higher priority than the second customer rule. Indeed, successive customer rules—i.e., n priority rules—can be defined. There can be a first cluster of rules with priority 1, 2, 3, 4, 5 (or more or fewer), and a second cluster of rules with priority 1, 2, 3, 4, 5 (or more or fewer), and successive clusters of rules with priority 1, 2, 3, 4, 5 (or more or fewer). I.e., a method of booking can be, in a first cluster, to exhaust all seats in the first priority booking in preference 1, then all seats in the second priority booking in preference 2, until all seats are iteratively exhausted in preferences 3 to n. Then, in a second cluster, to exhaust all seats in the first priority booking in preference 1, then all seats in the second priority booking in preference 2, until all seats are iteratively exhausted in preferences 3 to n. And so on, until all clusters are accounted for. The foregoing iterations can be done whether there are one or more clusters, or simply single rules.

The priority rules and clusters thereof can be stored in a matrix, matrices, and submatrices such as in a tabular form. A booking can be made based on the first customer rule, because the second customer rule is a lower priority than the first customer rule. A booking can be made based on the second customer rule, because there is no more availability of booking classes within the first customer rule, where the second customer rule is a lower priority than the first customer rule. A booking can be made based on an additional customer rule that is a lower priority than the first customer rule or the second customer rule. Rules can be assigned based on one or multiple factors, based on lowest cumulative price, highest overall value proposition, or another mechanism. The rules can be stored in various types of data structures; one such data structure is a matrix, or set of matrices and/or submatrices, and bookings are made based on exhaustion of available booking classes in a fare class for a specified carrier in a given priority.

Further disclosed is computer-implemented method for booking a flight for a traveller whose travel profile is not initially associated with a profile, based on determining that there is no initial profile stored for the traveller, loading a ghost profile comprising information associated with a customer on whose behalf the customer will be travelling, and storing, in a travel record, the information associated with the customer. A booking can accordingly be booked based on the above in accord with company rules. In addition, a booking can be based on storing, in the travel record, the traveller's first name and last name. The travel record can comprise a Passenger Name Record or similarly formatted record to assist in booking travel reservations.

DETAILED DESCRIPTION

Reference will now be made in detail to several non-limiting embodiments, including embodiments showing example implementations. The figures depict example embodiments of the disclosed systems, platforms and/or methods of use for purposes of illustration only. One skilled in the art will readily recognize from the following description that alternative example embodiments of the systems and methods illustrated herein may be employed without departing from the principles described herein.

The multiple record management (MRM) functionality can be configured to receive data from any source. In embodiments, the data provided can include the core elements required to book an air segment (e.g., traveller name, date, destination and flight time or flight number). The input data can be loaded by a user or can be received directly from another system. Once the multiple record management functionality has received the input data it can validate such data to ensure desired elements have been provided and alert the user if there is an error. Once a file considered complete and correct has been loaded then the multiple record management functionality processes the input, which can be line by line.

Figure 1A:
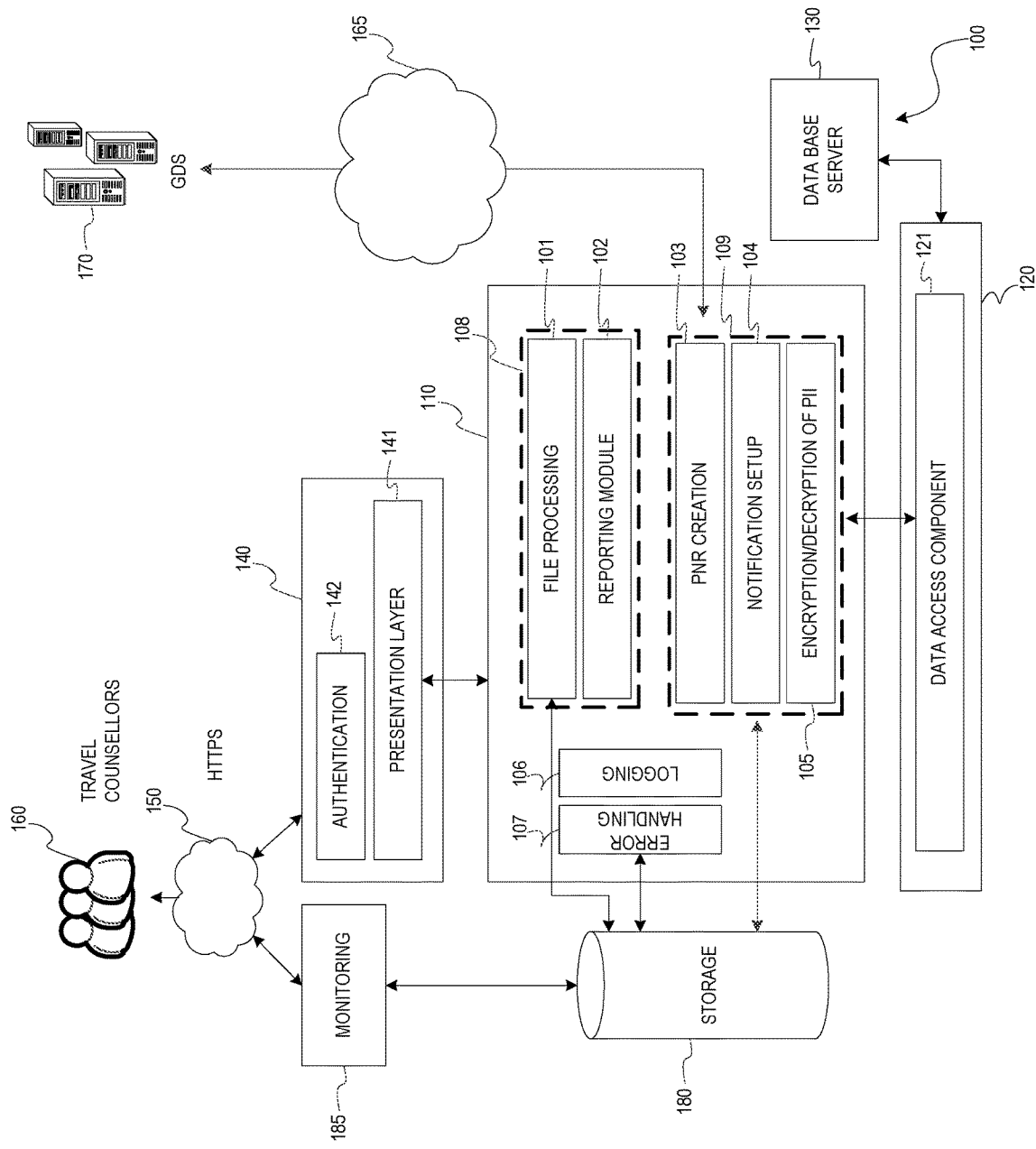
FIG. 1A is an example computing environment for assisting with optimizing travel booking mechanisms.
Figure 1B:
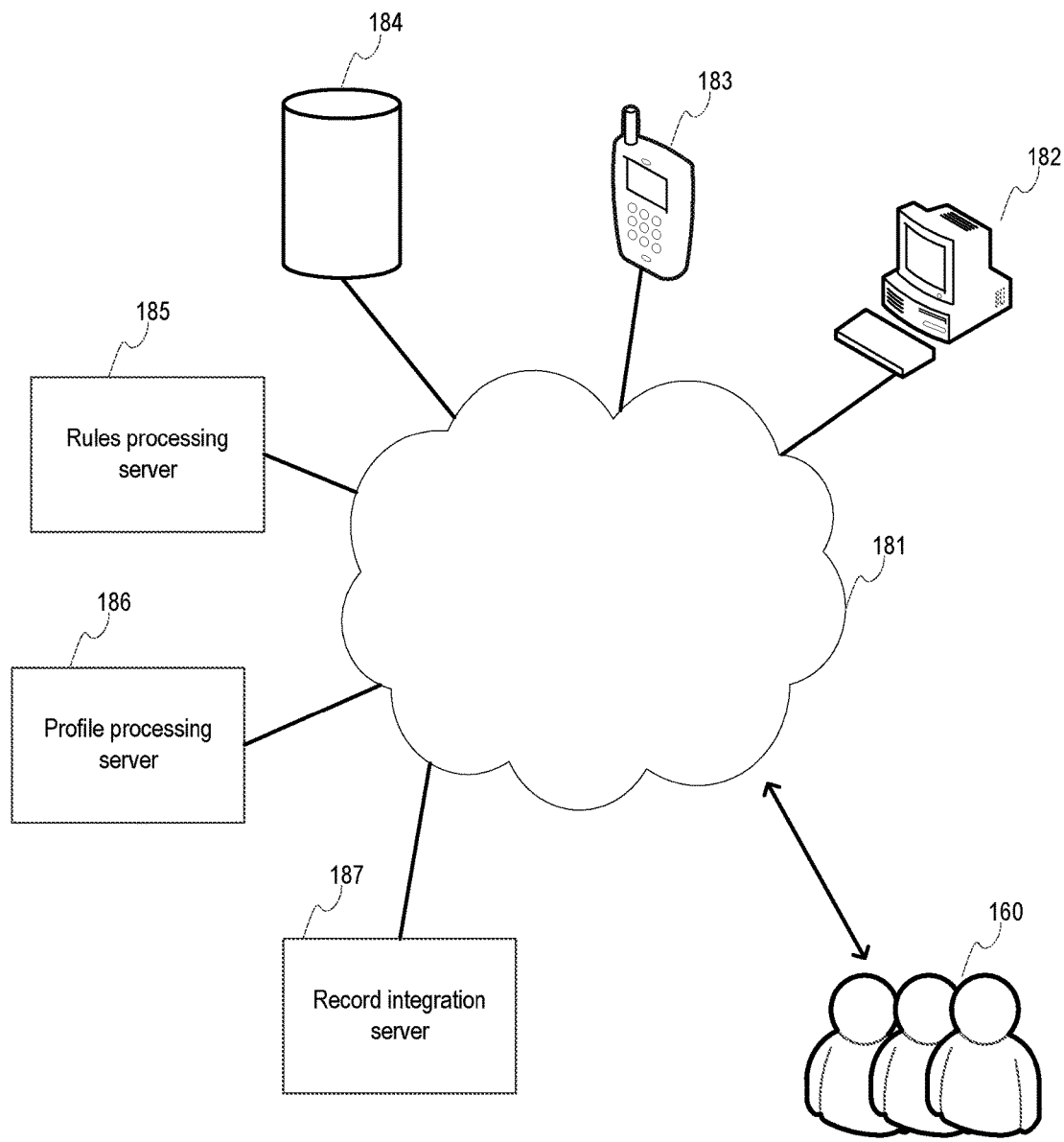
FIG. 1B is an added example computing environment for assisting with optimizing travel booking mechanisms.

FIG. 1 can illustrate a computing environment 100 for assisting with optimizing travel booking mechanisms. A multiple record management server 110 can carry out multiple actions, functionalities and processes. A file processing module 101 can accept as inputs files, and process appropriately to produce data as outputs, can be in operative communication with a reporting module 102. Reporting module 102 can prepare and transmit reports to a user such as a travel counsellor 160, or to other components of the system 100. File processing module 101 and reporting module 102 can comprise functionalities of a communications module 108.

It will readily be appreciated that, with respect to the foregoing, a computer, input device and display (wherein the foregoing can be singular or plural) can contain or be operatively associated with a processor(s), and with memory (ies) which may include software applications, and the combination of the above can be associated with multiple record management server 110.

In addition, it will be appreciated that, logically and/or physically speaking, such functionality, hardware, software and capabilities can be associated with and in operative communication with travel counsellors 160, Thus, travel counsellors 160 can be in operative communication, by or through a network 181, with a device, input device, and display 182. Devices, of course can themselves have a processor and memory for carrying out functions, or utilize those of other devices, on a sole or shared basis. Further, a mobile device 183 can assume these functionalities and capabilities. Further, a database 184 can contain desirable and/or necessary information. Further, a rules processing server 185 can be employed, such as to enable preference-based iterative booking of reservations. Further, a profile processing server 186 can be employed to facilitate booking a non-profiled traveller such as through a ghost profile. In addition, a record integration server can carry out functionalities and capabilities described herein. It will readily be appreciated that one or more devices, functionalities, and capabilities reflected in FIGS. 1A and 1B can be used, and responsibilities can be shared. In other words, many hardware, software, storage and network configurations, functionalities and capabilities in interoperation with each other can be put in place to make available processes and systems herein.

Computers, input devices and display can comprise a personal computer, a laptop, a tablet, a mobile device such as a smart phone, smart glasses, or a smart watch; it will be appreciated that any device containing or in operativa asociación with a processor(s) and a memory(ies) can serve the purpose of computer and input device. A printing functionality can be employed; this can be a printer(s) and/or functionality to generate and deliver electronic travel records A travel database interface module 109 can comprise a PNR creation module 103 that creates records comprising some or all information found in a PNR, such as from PNR information transmitted from GDS 170, such as over a network 165. It will be appreciated that GDS 170 can represent a GDS or a superset of information relating to travel records. Further, it will be appreciated that PNR information can be obtained from multiple sources besides a GDS. PNR information can be obtained from a non-GDS source, such as individual carrier, from a travel management company, from a customer, or other source. In addition, notification setup module 104 can enhance communications between and among components. Further, a module 105 can facilitate encryption/decryption of Personally Identifiable Information, such as that from a PNR record. A data access component 121 can facilitate transmission of information from multiple record management server 120, such as by a data access component module 121, to a database server 130 that can be used in accord with embodiments.

Added layers of functionality 140 can be used. This can include authentication 142, and a presentation layer 141 such as a graphical user interface (UI).

In addition, added storage 180 can be cloud-based and thus distributed. Such storage 180 can be in operative communication with a monitoring module 185 that can keep track of the functionalities, components and activities herein.

Travel counsellors 160 who can assist in managing reservations activities can be in operative communication with the remainder of the system 100 through a network 150.

It is understood that some or all of the foregoing functionalities, components and activities can be in operative communication via one or more networks, wired or wireless. Each of the foregoing functionalities can be controlled by mechanism of software instructions embodied in a non-transitory computer medium.

Figure 2:
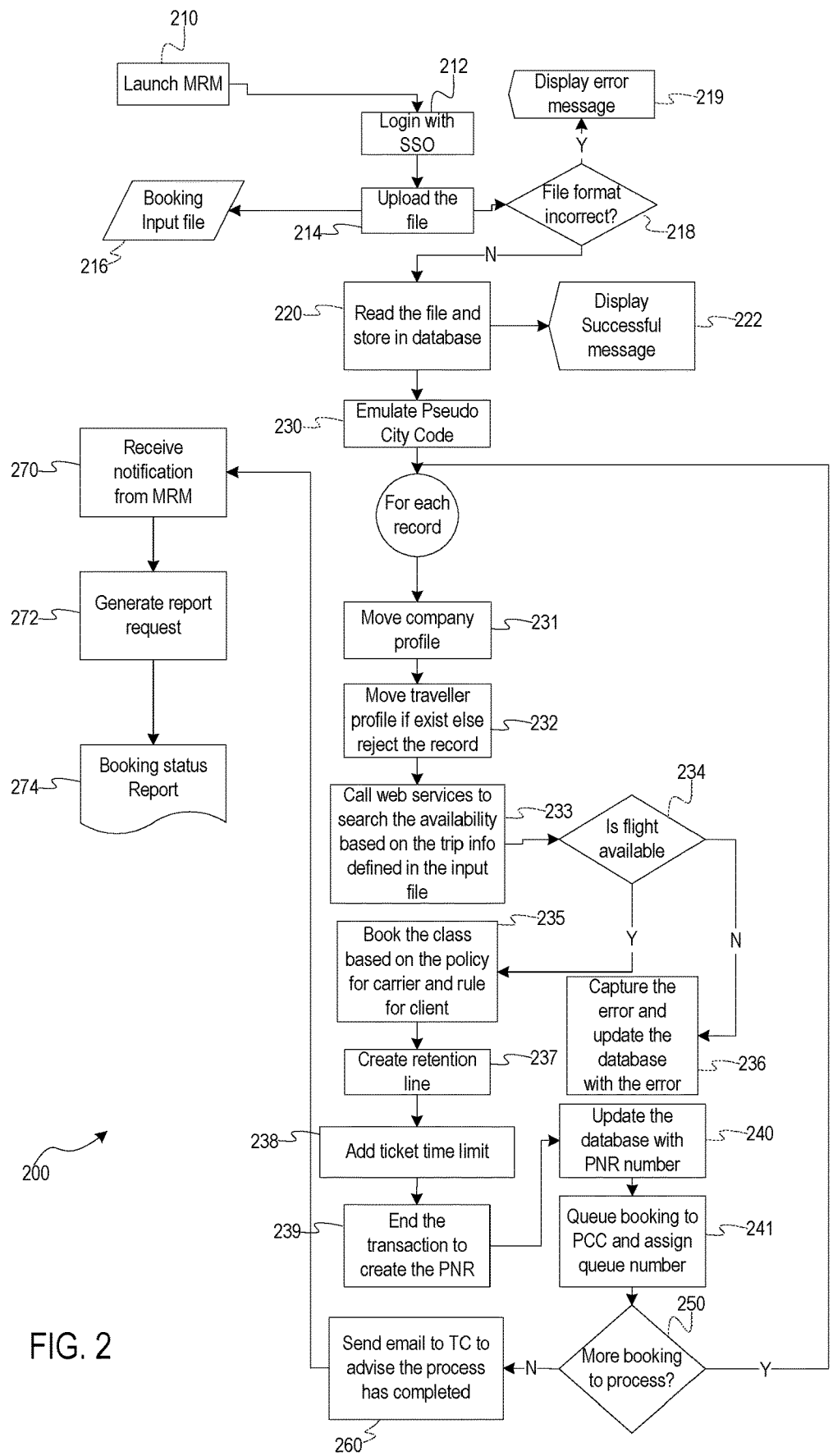
FIG. 2 is an example process for a mechanism to optimize travel booking.

Turning to FIG. 2, in non-limiting embodiments an example process for a mechanism to optimize travel booking is described. MRM functionality can be launched 210, and a login performed, as by a travel counsellor 160, such as by using a secure sign on. A file can be uploaded 214 containing reservations information, such as PNR information.

The file can contain reservation information such as destination and origin of flight personal details such as first name, last name. Also, the system can include pieces of reporting information as defined by the customer and which can be written into the UDI Ds. A UDID can be considered information that a customer wishes to collect at time of booking. A UDID is a term that has been used by a GDS.

Some or all of this information can be stored in a booking input file 216. It can be checked whether the file format is incorrect 218. In other words, it is checked whether expected elements have been provided. If the file format is considered incorrect, an error message can be displayed 219. If no, the file can be read and stored in a database 220, and a message displayed indicating success 222.

A pseudo city code (PCC) can be emulated 230. A pseudo city code can be considered an identifier linked with a location and/or other information of a travel counsellor. Such PCC can be associated with the client configuration. When a customer is set up a PCC can be defined that would be emulated to, and bookings in this PCC could contain the customer profile information and the corporate profiles from which information is retrieved to make a booking.

A company profile can be moved into a record 231 such as a PNR record. For example, information such as that of associated with an L1 company level profile and the individual L2 traveller profile can be moved into the PNR.

A shell PNR can be created for each trip. A shell PNR can reflect that subset of information associated with a PNR that can enable booking to continue. A shell PNR is a booking record with corporate profile information and traveler information copied into it but not necessarily with booking information. It is a record that is associated with specific travel request and is for the purposes of making a booking. A shell PNR is different from a normal PNR in that it does not necessarily contain destination and flight information. It could contain the PNR number, the relevant corporate profile information and the relevant traveler information.

A shell PNR can, for example, have a person's profile, a corporate profile, and flight details, but can lack certain information used to complete a defined transaction, such as reporting information on the reservation sendable to a customer, or information associated with a travel management company, or post-trip reporting information. The multiple record management functionality can move the associated L1 company level profile and the individual L2 traveller profile into the PNR. A traveller profile can be moved if it exists, and if one doesn't exist the record can be rejected 232. Once a file is uploaded, a request can be written into the database. The system can start at record 1 and move through the requests until it has no records left. Each request could create a shell PNR and use the details in the request to find the traveler and create a booking for that person based on the information in the request that has been uploaded into the database from the file.

Web services can be called to search the availability based on trip information defined in the input file 233. It can be checked whether the flight is available 234. If yes, the class can be booked based on the policy for the carrier and a rule for the client 235. A carrier rule is a rule set by a carrier. By way of non-limiting example, such a rule can be that no fee to change a flight will be charged up to 24 hours before a flight. Many carrier rules may apply.

A retention line can be provided 237. A ticket time limit can be provided 238, and the transaction ended, resulting in PNR creation 239. If, at step 234, it is determined that a flight is not available, then the error can be captured and a database updated with the error 236. Once a PNR has been created 239, a database can be updated with the PNR number 240. A booking can be queued to the PCC and a queue number assigned 241. If there are more bookings to process 250, control can pass, for each such record, back to step 231. If there are no more bookings to process, an email can be sent to a travel counsellor (TC) to advise the process has been completed, a notification received from the MRM 270, a report request generated 272, and a booking status report 274 made.

Figure 3:
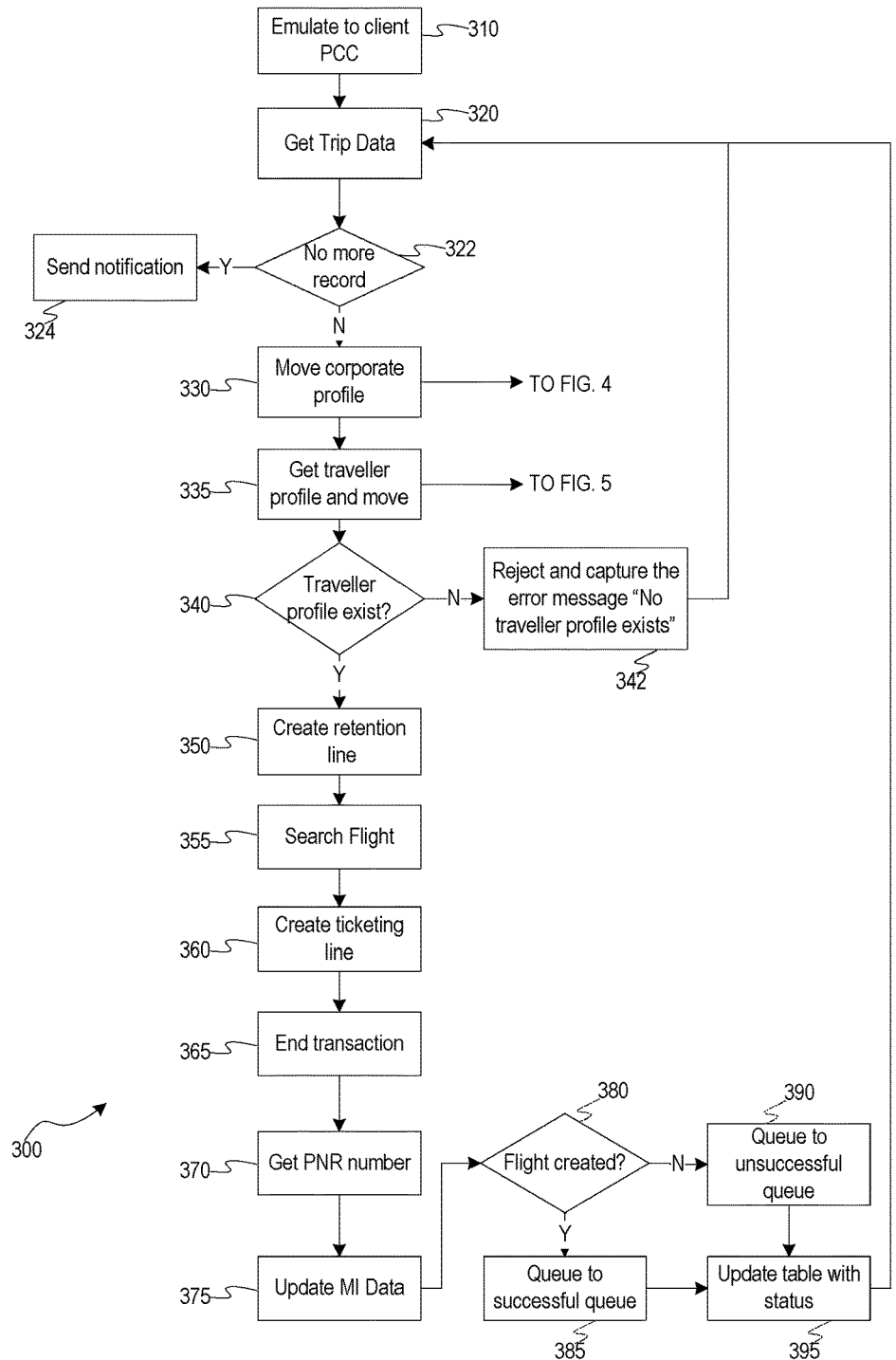
FIG. 3 is an example process for creating a shell PNR and acting thereupon.

In FIG. 3 are shown steps to create a shell PNR. A shell PNR can be employed in conjunction with the booking mechanism disclosed herein. The system can emulate to a client PCC 310. Trip data can be gathered 320. The system can determine if there are any more records to consider 322. If yes, a notification can be sent 324. If no, an operation can be performed such that a corporate profile can be obtained and some or all parts thereof moved 330. It will also be understood that the operation herein can comprise associating information associated with one data structure to a second data structure, resulting in physical and/or logical moving of information.

Figure 4:
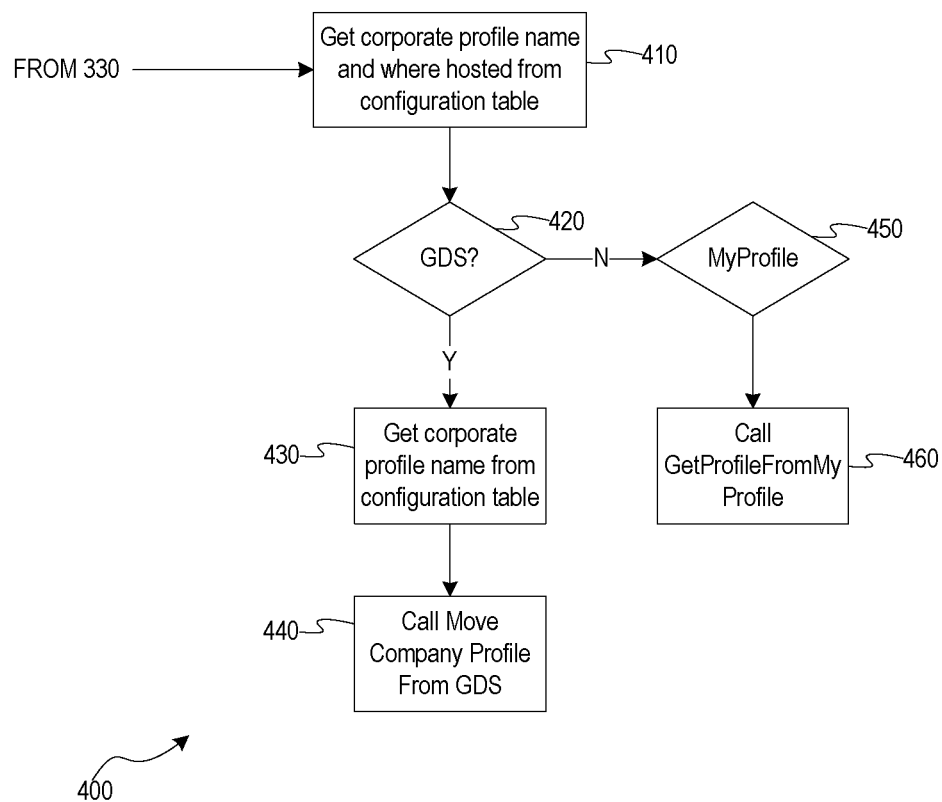
FIG. 4 is an example process for obtaining a corporate profile and acting thereupon.

Control can pass to steps that can be found in FIG. 4. In an example process 400, a corporate profile name can be obtained, along with hosting considerations thereto, as from a configuration table 410. It can be determined if a GDS is involved 420. If yes, a corporate profile name can be obtained from a configuration table 430, and a function such as Move Company Profile from GDS can be called 440. If no, a MyProfile function can be considered 450, and a GetProfileFromMyProfile function can be called.

The request to find a corporate profile can be completed by a web service whereby once a corporate profile is found, relevant information is written into a PNR. The web service can inform the system that it has found the corporate profile and written the information successfully allowing the system to move to the next step, such as step 335.

Returning to FIG. 3, a traveller profile can then be obtained and some or all information in it moved 335. It will also be understood that the operation herein can comprise associating information associated with one data structure to a second data structure, resulting in physical and/or logical moving of information.

Figure 5:
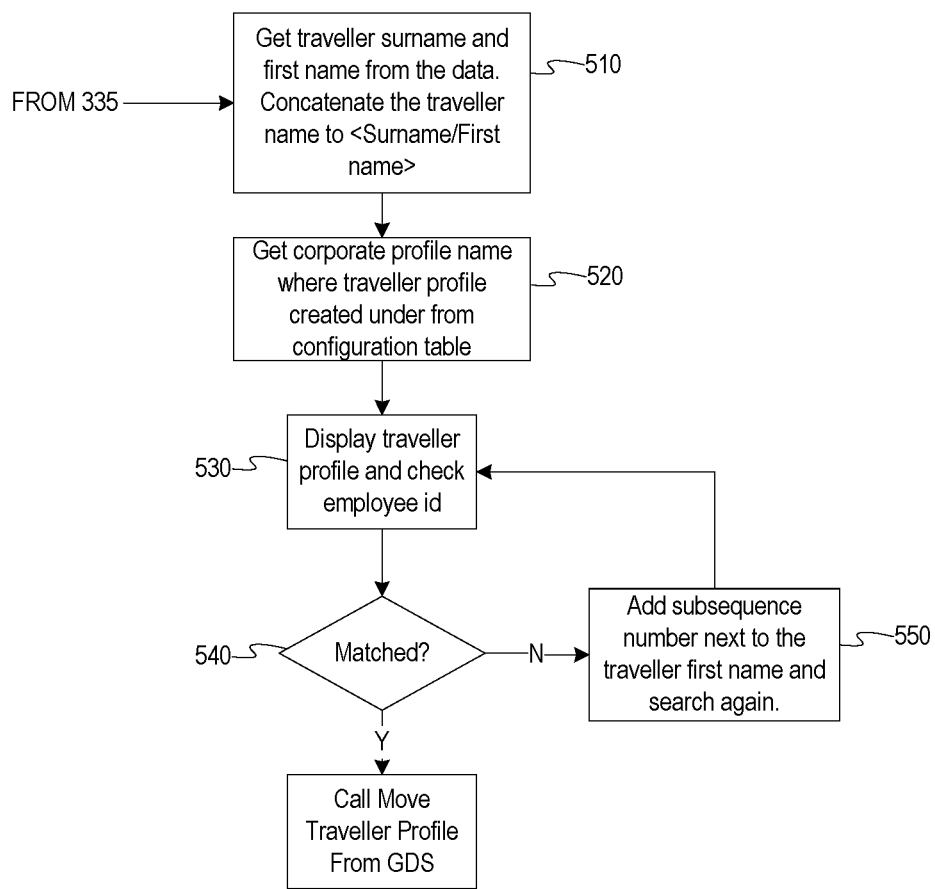
FIG. 5 is an example process for obtaining a traveller profile and acting thereupon.

Control can pass to steps that can be found in FIG. 5. In an example process 500, a traveller surname and first name can be obtained, and the traveller name concatenated to <Surname/First name> 510. A corporate profile name can be obtained where a traveller profile is created from a configuration table 520. The traveller profile can be displayed, and employee id checked 530. The system can determine if there is a match 540. If no, a subsequence number can be added next to the traveller first name and another search performed 550, returning control to step 530. If yes, a function such as Move Traveller Profile can be called from a GDS 560.

Accordingly, the system can send a request to the GDS via web service using an identifier such as customer ID to search for a profile. For example, a profile can be searched for, i.e., a profile designated 1234. The web service will tell the system if the profile has been found or not. If found the system can retrieve the profile and copy the information into a shell PNR. Once this has been done the web service tells can tell the system it has been completed.

Returning to FIG. 3, the system can determine if a traveller profile exists 340. If no, a rejection can be made and captured in connection with the error message "No traveller profile exists" 342, and control return to step 320. If yes, a retention line can be created 350. Further, a flight can be searched 355. A ticketing line can be created 360. And, the transaction can be ended 365. The system can get a PNR number 370 and update MI data.

MI data is data that can have been defined by a customer and travel management company for reporting. Typical information captured for MI data would be fields including: cost centre; Organisation division: Marketing etc. This information can be used downstream by customers to reconcile their travel spend and can be utilized by travel reporting tools.

A determination can be made whether a flight was created 380. If no, control can recognize a queue to an unsuccessful queue 390, and a table updated with status 395. If yes, control can recognize a queue to a successful queue, and a table updated with status 395. In either case, control can return to step 320.

Figure 6A:
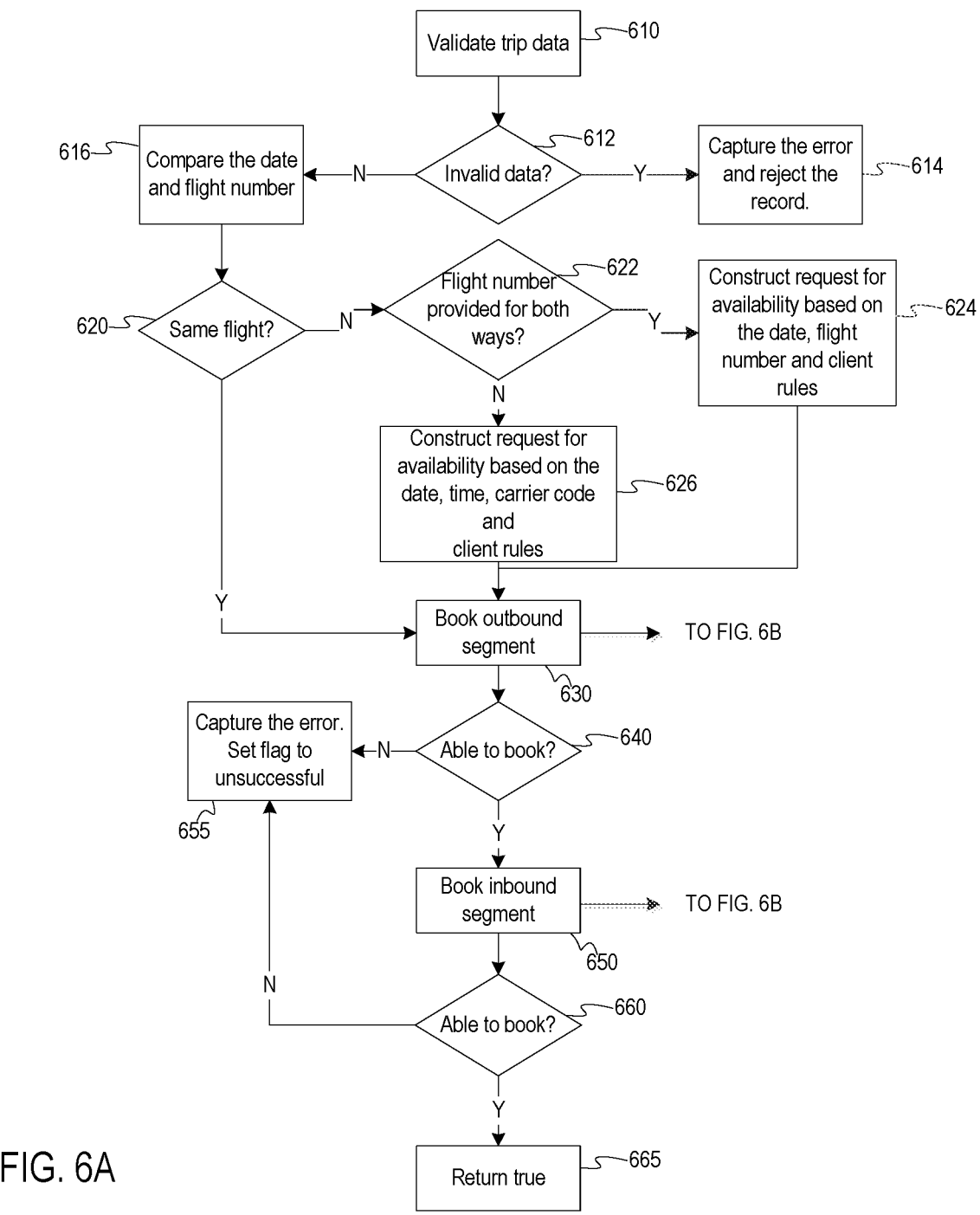
FIG. 6A is an example process for determining a flight to book and other considerations for facilitating a booking.

The system can work in step process. It can move to a step or steps in FIG. 6 when it has successfully found the corporate profile and travel profile and moves to searching for the trip requested by the customer in the upload file. FIG. 6A is an example of facilitating a booking.

For example, a customer can have requested Qantas flight number 123 on a given date. The system would take this information requested in the file upload and check if this flight exists, such as in a GDS, via a mechanism such as web services to build a request on the above data.

Trip data can be validated 610. A determination can be made if there is invalid data 612. If yes, the error can be captured and record rejected 614. If no, the date and flight number can be compared 616. A determination can be made if the same flight is being considered 620. If yes, an outbound segment can be booked 630, and control can pass to FIG. 6B. If no, it can be determined if a flight number is provided for both ways 622. If yes, a request can be constructed for availability based on the date, flight number and client rules 624, and control pass to step 630. If no, a request can be constructed for availability based on the date, time, carrier code and client rules 626, and control pass to step 630. At step 640, it can be determined if a booking was possible 640. If no, an error can be captured, and flag set to unsuccessful 655. If the answer at step 640 is yes, an inbound segment can be booked 650, with control passing to FIG. 6B. Again, it can be determined if a booking was possible 660, and if no an error captured and flag set 655. If yes, operations can return true 665. Once a booking is made, it could fill added information into the PNR and queue for processing to be ticketed, then another booking started.

Figure 6B:
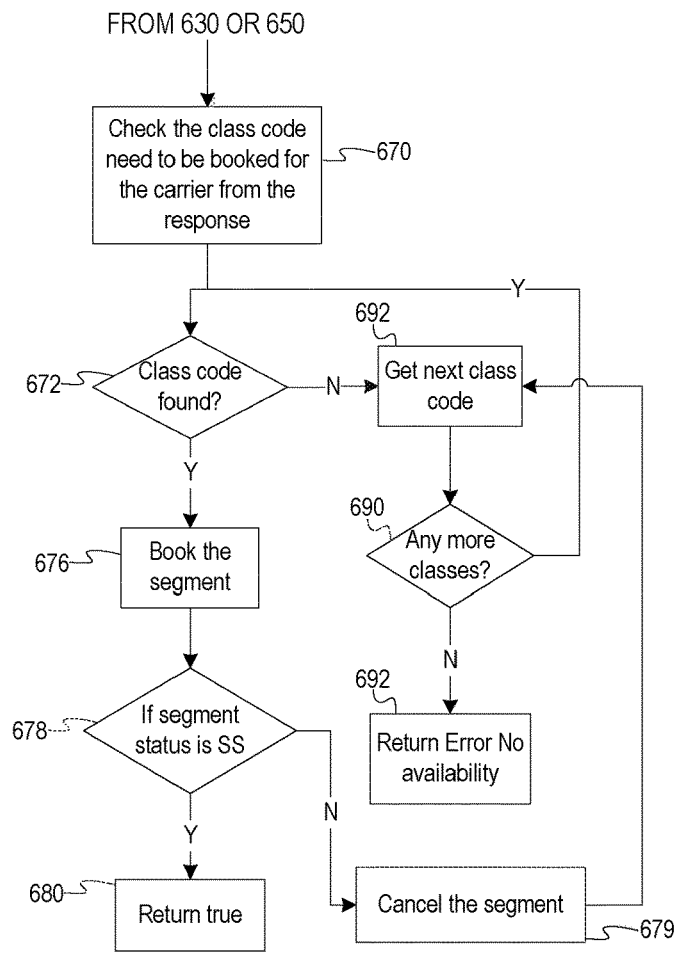
FIG. 6B is an example process for determining a flight to book and other considerations for facilitating a booking, with special emphasis on considerations relating to segment and booking class.

FIG. 6B is an example of facilitating a booking. It can be checked whether the class code needs to be booked for the carrier from the response 670. It can then be checked if a class code is found 672. If yes, a segment can be booked 676. If no, the next class code can be obtained 692, and then it can be determined if there are any more classes 690. If yes, control can pass back to class 672; if no, an error can be returned indicating no availability 692. After a segment is booked 676, it can be determined if the segment status is SS, which can correspond to a status indicating that the booking requested is confirmed. If no, the segment can be canceled 679 with control passing to step 692, and if yes operations can return the status true 680. Booking can be completed, and the booking queued for processing.

Generally speaking, a customer seeks to optimize its travel booking. On the one hand, a customer can look to spend minimum resources required in order to obtain the desired reservations, i.e., pay the most inexpensive overall total of prices. However, price is one factor only in optimizing travel booking. An added factor is flexibility. One aspect of flexibility is ability to change the reservation date and/or booking class while incurring minimal or no rebooking fees, or even to cancel the reservation entirely. Put another way, generally speaking, the cheaper the ticket, the greater the conditions (e.g., restrictions) that may be associated with it. A further factor are considerations relating to employee travel experience, such as comfort during the journey; first class or business class, while perhaps more expensive, can yield a higher level of comfort than economy class. Still more, another factor is luggage limitations; for a customer's employee who goes on an extended trip, that employee may need to bring added luggage. Even more, the customer may have negotiated a price with a particular air or ground carrier for a volume discount, for a certain minimum or maximum number of individuals in a given booking class, or other considerations, including two or more of the above factors. In short, overall customer value resulting from the booking process can include many factors, price being one factor but potentially not the exclusive factor or, at times, even the most important factor. Put another way, obtaining the best overall value proposition for the client can be based on one or many factors.

Adding to the complexity, air carriers often have multiple booking classes. A booking class can be considered a pricing and services package provided by the carrier associated with a certain reservation. For example, "economy class" is a commonly used term to suggest that the traveler will be seated in a certain portion of the aircraft, and a certain fare will be associated with this area of seating. "Economy class", as a generalization, can result in a cheaper price for an airfare than for "business class", which itself can be cheaper than "first class". However, there may be "subclasses" within "economy class". For example, one economy class fare can be associated with greater flexibility to cancel the given reservation and then rebook another reservation without incurring a penalty. In other words, the airline may charge a premium for the right to cancel without a penalty. Again, generally put, the fewer the restrictions, the more expensive the booking. There are many options affecting conditions—including but not limited to restrictions, rights and obligations—within any given booking class, including the following. Certain booking classes are easier than others to upgrade. Another is vulnerability to being bumped off the flight if it is oversold. Another is amount of frequent flyer miles, or point-based upgrades. Another is leg room. Another is amount of luggage a traveller can take. Another is minimum stay. There are added distinctions resulting in further subclasses and sub-subclasses, and so on.

There may be the above type of distinctions beyond economy class, such as in business class and in first class, which—in terms of conditions—can have these types of nuances and others.

In reality, then, although an airline may have three or more "travel classes"—such as first class, business class and economy—there can be 10-20 booking classes, or more. Seen another way, if one is seated in an "economy class" seat, the seat to one's left can be more expensive and belong to a different booking class (e.g., greater right to cancel or upgrade) and the seat to one's right can be less expensive and belong to yet another booking class (e.g., lesser right to cancel or upgrade).

Although a booking class and its conditions can vary across airlines, many airlines assign a letter code to a booking class. Y can indicate economy, J can indicate discount economy (perhaps cheaper than Y, but with added restrictions), K can indicate a further economy booking class, B can indicate yet another economy fare class, and so on.

Figure 7:
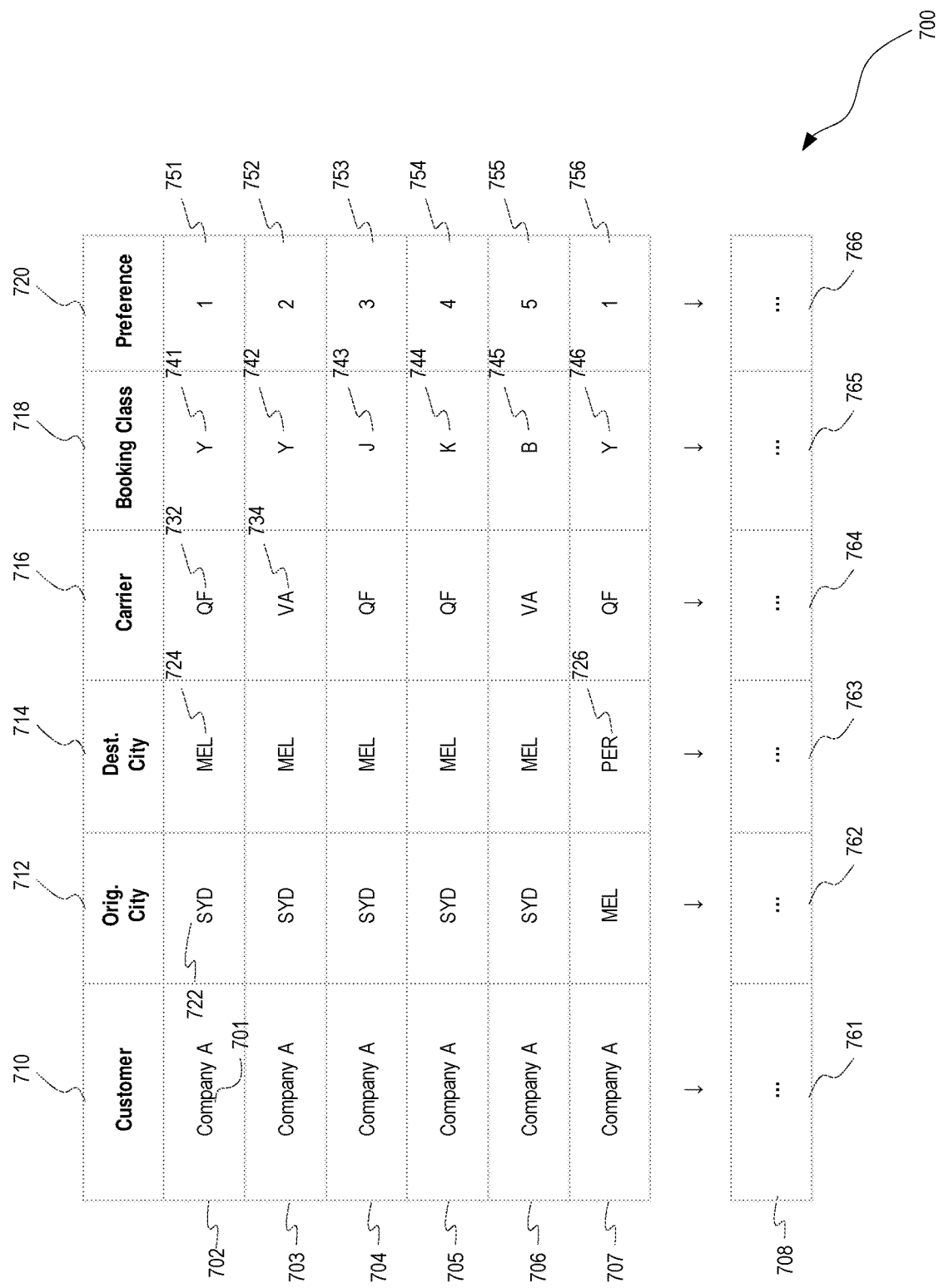
FIG. 7 is an example set of customer rules storable in the form of matrices.

Turning to FIG. 7, provided is an example table reflecting customer rules for booking classes. Shown therein is a column indicating the specific customer 710. Here the customer is Company A 701. Rules are established based on selected parameters. One parameter is origin city 712. Here it is Sydney 722. Another parameter is destination city 714. Here it is Melbourne 724. The carrier column 716 indicates that two are listed here: Qantas (QF) 732, and Virgin Australia (VA) 734. Further, a booking class 718 is given. Here is shown booking class Y for Qantas 741. Also, it will be seen that booking class Y is given for Virgin 742. It will be appreciated that although the signifier for the same booking class, Y, is provided, there may be different restrictions, rights and obligations as between Qantas and Virgin, illustrating that there can be significant variation for the "same" booking class on different carriers. Then again, there can be many similarities for the same booking class even though on different carriers. Shown in "Preference" 720 is a predetermined priority provided by or for the customer.

As seen in row 702, then, for booking a flight for an employee traveling on business from Sydney to Melbourne, Company A's first preference is on Qantas in booking class Y. It could be the first preference because this is, on an absolute pricing basis, simply most inexpensive. On the other hand, it could be the first preference based on price and another factors, such as luggage allowance. In other words, the best price on Qantas for this flight might be, for example, $300. This may yield the best value to Company A, as expressed by overall value proposition. However—and again depending on the conditions associated with booking class Y—booking class Y may result in a greater value proposition to Company A, even though it may have a slightly higher price, e.g., $320. This value proposition can be expressed in reference to multiple factors some of which are described above (luggage, flexibility of rebooking, etc.)

As seen in row 703, the second preference 752 by Company A for a flight from Sydney to Melbourne is not on Qantas, but on Virgin 734. However, the booking class may be denominated with the same class, i.e., Y 742. Again, the set of conditions in Qantas's booking class Y may have similar or dissimilar attributes to those in booking class Y 741 for Qantas.

The third preference 753 for Company A is seen in row 704. Here the carrier is again Qantas, but now booking class J 743. Booking class J can vary from carrier to carrier, but it could correspond to Business Class. The fourth preference 754 is seen in row 705. It is again on Qantas, in booking class K, which could be a type of Economy Class. And, a fifth preference 755 can be reflected in row 706, where Company A would select Booking Class B, which can be a type of Economy Class.

It will be seen that there are two "first preferences" in column 720, i.e., row one 751 and row six 756. To disambiguate, the reason for the two is because one refers to a Sydney-Melbourne origination-destination pair 722, 724, and the other a Melbourne-Perth origin-destination pair 724, 726. Further, it will be appreciated that added preference sets can be postulated for Melbourne-Perth, reflecting rules permutations of different carriers and different booking classes (or other parameters), similar to that for Sydney-Melbourne. These added preference sets can be represented by row 708, and column entries 761-766. It will be readily appreciated that there can be more rows and columns can be added, corresponding to added to added preference and, more broadly, added rulesets.

In other words, customer rules 700 can be understood as one matrix or multiple matrices, depending on parameters considered, that reflect a predetermined set of preferences, each preference having a unique set of individual values (values being origin, destination, booking class, etc.). A first matrix can be seen as comprising preferences 1-5 (751-756) for Sydney to Melbourne, i.e., a table of five rows (702-707) and six columns (710-720). A second matrix can be considered as that comprising the first matrix plus row 707, which itself has a "second" first preference. In concept, then, multiple matrices can be defined comprising customer rules, and subsets of those rules. Individual "metarules" can be hypothesized based on combinations of customer rules. One such metarule can be one defined such that where flying a distance of 500 kilometers or greater, a booking class of a certain type or types is a first preference, may never be a last preference, may never be a preference at all, etc. In short, one or more preference matrices (or submatrices within a matrix) can be defined based on customer rules and metarules.

In a non-limiting example, suppose Customer A wishes to enable an employee, Bob, to travel from Sydney to Melbourne. The system can identify a set of customer rules 700. Based on these rules, it is evident that the first preference for such journey is on Qantas booking class Y. Assume for purposes of illustration that Qantas has a total of three such reservations available on the given flight. The system can determine if a reservation can be booked on Qantas in booking class Y under such circumstances. If so, the system can book this reservation. As a result, there are now two such reservations remaining on Qantas in this booking class. Now, Customer A wishes to send its employee Jane from Sydney to Melbourne, Similarly, the system can identify a set of customer rules 700. Based on these rules, it is evident that the first preference for such journey is on Qantas booking class Y. The system can determine if a reservation can be booked on Qantas in booking class Y under such circumstances. If so, Jane can be booked as well. As before, the number of remaining reservations available is now reduced to one, two having been used for Bob and Jane.

Assume that Customer A, as before, wishes to enable employee Jack to travel likewise, and the third and final reservation is booked. If Customer A wishes to enable Jill to travel likewise, preference 751 will be evaluated. However, there are no remaining reservations available subject to this first preference, having been taken by Bob, Jane, and Jack. Therefore, the system can move to consideration of the next preference 752. This preference defines using a different carrier, Virgin, even though the class is given as Y. As a result, Jill can be booked on Virgin under these circumstances.

In accord with the foregoing methods, a customer can enable employees to travel based on a preference set declining in value (i.e, more preferred to less preferred). Once available reservations from preference 1 are exhausted, available reservations from preference 2 are booked. Once 1 and 2 are exhausted, the system can book from preference 3. Once these are exhausted, the system can book from preference 4, and so on. Put another way, a mechanism herein is to exhaust available reservations within a first preference, then book until exhausting available reservations in a second preference, and so on, until all travelers within a database or document are accounted for.

There are two carriers shown in FIG. 7, but there may of course be significantly more carriers. There can be significantly more preferences. There can be special logical arrangements specified, including Boolean logic. For example, if preference 1 reservations are exhausted then the system books in accord with preference 2, unless an overall budget is exceeded, in which case preference 3 is used. In other words, there can be a sizable amount of rules and concatenations of rules, resulting in if-then arrangements, Boolean arrangements, etc. For context, doing so can optimize overall booking value to the customer based on many scenarios and permutations. A basic case can be where the booking rules result in overall minimum price. However, there can be many scenarios and permutations of use of booking rules where overall value is provided that exceeds what is considered merely to be a price-driven value. In other words, preference-driven bookings can be made based on a customer-defined overall value proposition.

Further, it will be appreciated that the system can use the ruleset mechanism on an automatic basis, without manual intervention. The system can iterate on behalf of each traveler, attempting to book via the rulesets provided. If an error is thrown, it can be flagged. The automatic mechanism can be accomplished by transmitting a communication to a database, such as a GDS. The communication can comprise a search string, but it can be composed and comprised of many forms.

It should be appreciated, however, that such automated iteration through travelers in order to make bookings is not necessarily based on linking, associating, or otherwise creating dependencies of one employee to another, even if two or more employees may be going to a given destination. Each of the travelers can be iterated by the system independently of another.

Thus, in embodiments, a method of booking can be, in a first cluster, to exhaust all seats in the first priority booking in preference 1, then all seats in the second priority booking in preference 2, until all seats are iteratively exhausted in preferences 3 to n. Then, in a second cluster, to exhaust all seats in the first priority booking in preference 1, then all seats in the second priority booking in preference 2, until all seats are iteratively exhausted in preferences 3 to n. And so on, until all clusters are accounted for. The foregoing iterations can be done whether there are one or more clusters, or simply single rules.

In addition, carriers can define specialized booking classes. I.e., a booking class can be carrier-specific. It is possible that a customer can reach a special arrangement with the carrier, meaning there can be a booking class specially defined for this customer. Special rules can be added based on multiple considerations, including meta-rules.

The multiple record management functionality can complete an availability request for the air segment based on a predefined set of rules specific to each respective client. These rules can pertain to the class of travel allowed and the routes that can be booked. The rules engine can define the rule on a route basis, on a carrier basis, and then booking class via preference of 1, 2, 3 etc. A different sequence can be used, and added customer-defined parameters employed. Thus, the system can have one preference only, or N preferences including but not limited to customer, route, carrier, booking class(es) available on route, and more.

FIG. 11 is a non-limiting example of a process for booking. The system can identify a reservation parameter(s), including but not limited to origin city, destination city, carrier, and booking class 1110. A customer rule(s) can be identified 1120. A carrier policy can be identified 1130. There can be an interrelation of parameters associated with the customer rule identification 1120 and carrier policy identification 1130. Preferences can be assigned 1140. Rule clusters can be identified 1150. The system can iterate through preferences from high to low priority of preference 1150, based on iterating single rules, clusters, or any combination of the above.

If an appropriate air segment is available then the multiple record management functionality can book that segment and create the retention line in the PNR. A retention line can be considered a GDS command to keep a booking live after it would normally be removed by a GDS. As the Reloc PNR identifier can be reused by the GDS a retention line is used to keep ownership of the booking so it is not reclaimed by the GDS. The multiple record management functionality can add a ticketing time limit based on the individual rule configured for the client. The multiple record management functionality can provide the ability to include client-specific data elements in the PNR which are used by downstream systems to generate reporting. The multiple record management functionality can send the PNR to a predefined queue for downstream processing.

If the multiple record management functionality is unable to process a request then it can log the associated error message in its database. If a PNR has been created then it can be sent to an error queue to for processing such as by a travel counsellor.

Once all or a predetermined amount of records from an input file have been processed, then a message to the requestor can be generated to alert that the file has been processed. This message can provide a unique identifier for the request and give the user a summary of the request so the requestor can see how many records were successfully processed and how many records failed due to errors. The requestor can then enter the unique identifier for their request to get a more detailed snapshot of their request that lists individual records and provides the status of the record (success/failure), the associated PNR number if applicable and the error message in the case of a failure. This snapshot can be exported to an Excel file or other file. The multiple record management functionality can also provide the ability to search by date range and PNR number.

The multiple record management functionality can have role-based access control so an individual user can submit requests and access reporting based only on clients that they have been granted access by an administrator. Administrators can also have the ability to create and configure clients.

In certain situations, the system may have access to a profile of a traveler that has already been entered into the system. However, it can be the case that the traveler is not in the system. For example, there can be a last-minute need for a traveler to make a journey, and information for this individual has not yet been entered into the system. Additionally, the traveler may be one who is not a regular employee, and/or there will not be a need to create and store a full traveler profile for this individual. In some circumstances, booking methods may encounter difficulty with processing a non-profiled traveler. In other circumstances, the system may be able to book a non-profiled traveler, but may not be able to do so in full accordance with company rules, may not be able to provide full reporting, there may be potential inaccuracies, etc.

In the case of a non-profiled traveler, a ghost profile can be established. In a non-limiting example, a ghost profile can comprise a template into which a set of information can be placed. Put another way, a ghost profile can comprise a configurable menu of variables into which values can be placed. Additionally, a ghost profile can be enlarged by overlaying added templates or sub-templates.

In other words, a ghost profile can be considered the following. A ghost profile is a travel profile where the traveler first name and last name are not associated with a real customer and/or traveler. But information related to a cost centre and division are specified so when the system creates a non-profiled traveler booking it could copy the ghost profile into the PNR and then take traveller information such as first name and last name and overwrite these fields from the ghost profile in the PNR.

As seen in FIG. 8, in an environment where a customer desires that a reservation be made available for non-profiled traveler, a ghost profile mechanism 800 can be employed. The system can check for a traveller's unique ID 810. It will then be checked 820 whether the profile for the traveller is stored in the system, or is in storage in operative communication with the system. If the traveller's profile is retrievable, standard profile procedure can be followed 830.

If, however, it is determined at step 820 that there is no profile associated with this traveller, a search can be made for whether there is a ghost profile associated with this company 840. If one is so associated, then company and reporting information can be obtained and instantiated within a data structure corresponding to a template that can store relevant information drawn from a predetermined set of information, and potentially accept new information. Information from this ghost profile can be placed into a relevant PNR 860. Further, a booking can be made based on company rules 870.

Information in a ghost profile can include but not be limited to: The company name; The company address; contact numbers; form of payment for the booking; travel arranger contact details (who is making the booking on behalf of the company); servicing group (which team within travel management company is servicing this customer); Invoicing details; Customer reporting details (Department, Division, cost centre etc); Customer fees to be applied to the transaction; and Information about the online booking which is used to automate the ticketing.

Lines or regions of a travel record such as a PNR can include fields or locations for information that can be located in a ghost profile. Such lines or regions can include subject matter relating to the following among others: customer address, contact number, form of payment, reporting data (department, etc.), queue information for processing, and customer defined data cost centre.

In other words, one manner in which a ghost profile can be considered is as a template or repository of predetermined information; information from the foregoing can be populated at time of booking or another time.

FIG. 9 is an example screenshot illustrating that a file can be uploaded that contains traveller information 910. For example, a file can be uploaded that includes one or more travellers who are employees for Company A 920. It will be appreciated that the file may contain added travellers who may, or may not, be employees of Company A. The file can be chosen 930. Certain file types can be supported, such as but not limited to Excel file types; it will be appreciated, however, that many file types can be used. Further, an itinerary can be chosen to be sent 940.

FIG. 10 is an example screenshot illustrating that a search can be performed based on specified criteria 1010. Such criteria can but are not limited to status of the booking made by the system 1020, reference id 1030, and PNR 1040 The search can be carried out by interacting with a GUI of which FIG. 10 is an example, can be date-restricted 1090, and can be done for a specified client 1080. When appropriate criteria are selected, a Search button 1060 can be actuated. Further, a file can be exported with a given file format 1050, e.g., CSV, such as by actuating an Export button 1070.j While various details have been set forth in the foregoing description, it will be appreciated that the various aspects of the travel booking mechanism process may be practiced without these specific details. For example, for conciseness and clarity selected aspects may have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Reference to "one aspect," "an aspect," "one embodiment," or "an embodiment" means that a particular method, feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular methods, features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the claims are intended to cover all such modifications and variations as falling within the scope of the disclosed embodiments.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described methods, systems, components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "in operative communication", "operably connected," or the like to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the claims, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

With respect to the claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the claims are intended to cover all such modifications and variations as falling within the scope of the disclosed embodiments. The claims are intended to cover all such modifications and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated.

The invention claimed is:

1. A system for utilizing an employer ghost profile records template of an employer of a business traveler to populate information in a Passenger Name Record and then to book a flight for the business traveler in accord with the employer's travel rules, where the system has determined there is no profile record stored for the business traveler, the system comprising at least one hardware processor and a memory storing computer program instructions which when executed by the at least one hardware processor cause the at least one hardware processor to perform operations comprising:

determining that there is no profile record associated with the business traveler, resulting in the system storing that the business traveler has a non-profiled status;

searching for the employer ghost profile associated with the employer, the employer ghost profile corresponding to a records template into which information can be populated, the information stored in at least one field, the employer ghost profile unassociated with an actual individual traveler;

instantiating a data structure corresponding to data associated with the employer ghost profile associated with the employer;

copying into a Passenger Name Record, upon determining that the instantiated data structure has at least one field common to a field in the Passenger Name Record, data from the instantiated data structure and, at a time subsequent to copying data from the instantiated data structure into the Passenger Name Record, overwriting fields in the Passenger Name Record with the business traveler's first name and last name; and creating two bookings for the employer, one being a booking for the non-profiled business traveler, by executing the following instructions:

storing, in a rules processing server:

a first rule associated with the employer, the first-rule based on: an origin location for the flight, a destination location for the flight, and a first booking class associated with the flight, and assigning a priority to the first rule;

a second rule associated with the employer, the second rule based on an origin location for the flight, a destination location for the flight, and a second booking class associated with the flight, wherein the second rule has a lower priority than the first rule;

a third rule associated with the employer, the third rule based on a travel budget amount set by the employer and associated with a third booking class;

booking a seat in the first booking class based on the first rule, resulting in a first booking;

determining, based on a first electronic communication from a travel reservations database, that seats associated with the first booking class have been exhausted;

determining, based on a second electronic communication with the travel reservations database, that a seat in the second booking class is available;

determining that the seat in the second booking class, if booked, would result in exceeding the travel budget amount set by the employer;

determining that a third electronic communication from the travel reservations database shows that a seat in the third booking class is available for booking;

determining that booking the seat in the third booking class is more economical than booking the seat in the second booking class; and booking the seat in the third booking class based on the third rule, resulting in a second booking, wherein at least one of the first booking and second booking are based on employer ghost profile data populated in a Passenger Name Record.

2. The system of claim 1, wherein the first rule associated with the employer, second-rule associated with the employer, and third rule associated with the employer are structured for storage in a matrix or matrices, and each row of the matrix or matrices are iterated such that bookings are made based on exhaustion of available booking classes in a fare class for a specified carrier in a given priority.

3. The system of claim 1, wherein a first cluster of priority rules is defined, and second cluster of priority rules is defined, and control passes iteratively from a higher priority to a lower priority.

* * * * *